United States Patent
Joubert et al.

(10) Patent No.: US 10,513,342 B2
(45) Date of Patent: Dec. 24, 2019

(54) METHOD FOR MANAGING IMBALANCE IN A DISTRIBUTED PROPULSION SYSTEM

(71) Applicant: Airbus (S.A.S.)

(72) Inventors: Emmanuel Joubert, Issy-les-Moulineaux (FR); Laurent Juve, Issy-les-Moulineaux (FR); Thibault Baldivia, Paris (FR); Clément Veillerot, Paris (FR)

(73) Assignee: AIRBUS (S.A.S.), Blagnac (FR)

( * ) Notice: Subject to any disclaimer, the term of this patent is extended or adjusted under 35 U.S.C. 154(b) by 0 days.

(21) Appl. No.: 15/955,264

(22) Filed: Apr. 17, 2018

(65) Prior Publication Data

US 2018/0305033 A1    Oct. 25, 2018

(30) Foreign Application Priority Data

Apr. 19, 2017 (FR) .................................. 17 53376

(51) Int. Cl.

| B64D 31/10 | (2006.01) |
|---|---|
| G05D 1/08 | (2006.01) |
| B64D 27/24 | (2006.01) |
| G05D 1/00 | (2006.01) |

(52) U.S. Cl.
CPC ............ *B64D 31/10* (2013.01); *B64D 27/24* (2013.01); *G05D 1/0072* (2013.01); *G05D 1/0825* (2013.01)

(58) Field of Classification Search
CPC ...... B64D 31/10; B64D 27/24; G05D 1/0072; G05D 1/0825
USPC .......................................................... 701/8
See application file for complete search history.

(56) References Cited

U.S. PATENT DOCUMENTS

| 4,884,205 A | 11/1989 | Hernandez-Diaz | |
|---|---|---|---|
| 5,927,655 A * | 7/1999 | Larramendy | B64D 31/10 244/195 |
| 8,050,808 B2 * | 11/2011 | Delporte | G05D 1/0808 244/194 |

(Continued)

FOREIGN PATENT DOCUMENTS

| CA | 684060 A | 4/1964 |
|---|---|---|
| DE | 1151178 B | 7/1963 |
| DE | 102012104783 A1 | 12/2013 |

(Continued)

OTHER PUBLICATIONS

French Search Report for French Application No. 1753376 dated Aug. 31, 2017.

*Primary Examiner* — Brian P Sweeney
(74) *Attorney, Agent, or Firm* — Jenkins, Wilson, Taylor & Hunt, P.A.

(57) ABSTRACT

A method for managing unbalanced thrusts caused by engine failures in an aircraft provided with a distributed propulsion system, the distributed propulsion system including 2N powertrains (PTi), with N a strictly positive integer and i an integer lying between 1 and 2N inclusive, distributed symmetrically in relation to a plane of symmetry of the aircraft, according to which the power of at least one powertrain belonging to a first side of the plane of symmetry is reduced when a failure occurs in a powertrain belonging to the opposite side, such that the sum of the moments of the thrusts generated by the powertrains in relation to the center of gravity of the aircraft is nil, to within regulatory tolerances.

10 Claims, 3 Drawing Sheets

(56) References Cited

U.S. PATENT DOCUMENTS

2016/0214731 A1* 7/2016 Schmidt ................ B64D 31/12
2018/0297712 A1* 10/2018 Oldroyd ................ B64D 31/10

FOREIGN PATENT DOCUMENTS

| EP | 0828206 A1 | 3/1998 |
| FR | 1090772 A | 4/1955 |
| FR | 2920410 A1 | 3/2009 |
| FR | 2937008 A1 | 4/2010 |

* cited by examiner

METHOD FOR MANAGING IMBALANCE IN A DISTRIBUTED PROPULSION SYSTEM

CROSS-REFERENCE TO RELATED APPLICATION

This application claims the benefit of and priority to French patent application number 17 53376 filed on Apr. 19, 2017, the entire disclosure of which is incorporated by reference herein.

TECHNICAL FIELD

The disclosure herein relates generally to the fields of flight mechanics and aircraft piloting, and more particularly to a method for managing imbalance in a distributed propulsion system.

BACKGROUND

Conventional line airplanes and multi-engine airplanes use at least two propulsion chains (6 for the larger airplanes, even 8 in the B52 or 10 in the B36), each having its own throttle lever. To pilot such airplanes, the pilot must be trained and qualified in multi-engine management.

Multi-engine training and qualification are costly, and can prove prohibitive for student pilots learning on multi-engine airplanes.

These days, there a few airplanes and helicopters that use distributed propulsion.

The Japanese aerospace exploration agency JAXA has for example developed an airplane in which the distributed propulsion is assured by several electric motors coupled in series to a single transmission shaft in order to actuate a single fan.

However, because of the presence of a single thrust member, any engine failure would not generate any imbalance in the flight of the aircraft from an aerodynamic point of view.

The Volocopter, the electric helicopter developed by the German company evolo, utilizes a propulsion architecture in which several engines are mounted in parallel, each being coupled to a propeller (rotor).

An engine failure in the Volocopter would necessarily induce an imbalance in the distribution of the lift of the aircraft, and would therefore necessitate the implementation of a specific engine management procedure by the pilot in order to maintain the control of the aircraft.

An engine failure can lead to a total shutdown of the engine or a lowering or reduction of its speed that can compromise the safety of the airplane and thereby that of the passengers and of the navigating crew, and more particularly during the critical take-off and landing phases.

One approach for limiting the impact of the total loss of the propulsion power is to duplicate the powertrains in an aircraft, one powertrain generally being composed of an engine, of a controller of the engine and of a propulsion force generation member of fan or propeller type.

A distributed propulsion in a two-seater aircraft for example is advantageous with electric motors having a high power density, dimensions which give them a lesser bulk, and suitable controllers.

In aircraft with distributed propulsion, a loss or a powertrain failure hardly ever means a loss of the overall propulsion of the aircraft.

Furthermore, a distribution of several propulsive members, such as propellers, on a wing makes it possible to increase the locale lift by virtue of the aerodynamic blast generated by the propellers, thus reducing stall speed of the aircraft.

However, these distributed propulsion architectures require complex piloting and management with a throttle lever for each engine in order to control the thrust imbalances. The pilots are therefore forced to apply difficult actions to manage the unbalanced thrusts in case of engine failure.

These days, developments in distributed propulsion constitute a key issue for the future of electrical aviation. The powertrain management avionics systems continue to be refined and optimized on an ongoing bases in order to automate and simplify the multi-engine piloting procedures.

SUMMARY

The disclosure herein addresses the need to facilitate the piloting procedure in a multi-engine airplane in case of total or partial loss of power in one or more engines and relates to a method for managing unbalanced thrusts caused by engine failures in an aircraft provided with a distributed propulsion system, the distributed propulsion system comprising 2N powertrains, with N a strictly positive integer and i an integer lying between 1 and 2N inclusive, distributed symmetrically in relation to a plane of symmetry of the aircraft, the power of at least one powertrain belonging to a first side of the plane of symmetry being reduced when a failure occurs in a powertrain belonging to the opposite side, such that the sum of the moments of the thrusts generated by the powertrains in relation to the center of gravity of the aircraft is nil, to within regulatory tolerances. This method is noteworthy in that each powertrain comprises an engine-controller assembly, composed of an engine and of a controller of the engine, coupled to a propulsive member, and in that each controller of a first side is assigned numerically to all the controllers of the opposite side by two transfer matrices each.

According to one embodiment, when a failure affects a powertrain of a first side and cancels the thrust delivered by the powertrain, the powertrain of the symmetrical opposite side of the failing train is shut off.

According to another embodiment, when a failure affects a powertrain of a first side and reduces the overall thrust on the first side, the powers of the powertrains of the opposite side are adjusted so as to have an overall thrust on the opposite side of moment in relation to the center of gravity of the aircraft equal to and opposite the moment of the overall thrust on the first side in relation to the center of gravity of the aircraft.

Advantageously, the aircraft in which the method is implemented comprises a data analysis and processing component. Furthermore, each controller is linked to the data analysis and processing component.

The propulsive member is formed by a shaft and a propeller for example.

According to one embodiment, a failure signal is sent to the data analysis and processing component by the controller of the powertrain when a failure affects the powertrain.

Consequently, the data analysis and processing component sends a shut-off signal to the controller of the powertrain that is the symmetrical counterpart of the failing powertrain.

Alternatively, the data analysis and processing component sends to the controller of each powertrain of the side opposite the side comprising the failing engine a specific instruction to adjust the engine speed and/or torque.

Advantageously, each controller is assigned numerically to the data analysis and processing component by two matrices equally.

In each of the 2N controllers there are implemented 2(N+1) transfer matrices which allow the computation of the speed and torque necessary to each powertrain to adjust the overall thrust on a first side comprising the powertrain as a function of the speeds and torques of the powertrains belonging to the opposite side.

The disclosure herein relates also to an aircraft with distributed propulsion in which is implemented a method as described. The distributed propulsion can be electrical or hybrid for example.

The fundamental concepts of the disclosure herein having just been explained above in their most basic form, other details and features will emerge more clearly on reading the following description and in light of the attached drawings, giving, by way of non-limiting example, an embodiment of a method according to the principles of the disclosure herein.

BRIEF DESCRIPTION OF THE DRAWINGS

Example drawings are referred to below. The various drawings and the elements of one and the same drawing are not necessarily represented to the same scale. In all of the drawings, the identical elements bear the same reference.

Thus, there are illustrated in.

DETAILED DESCRIPTION

A method of the disclosure herein applies to the piloting of airplanes, and of other types of aircraft (helicopters, drones, etc.), provided with a distributed propulsion system. It can also be applied to non-flying, standalone, autonomous vehicles.

A distributed propulsion system should be understood to be any set of powertrains of even cardinal distributed symmetrically in an aircraft in relation to a plane of symmetry of the aircraft.

The method primarily implements:
a regulation of engine speeds (in rpm) and torques (in N·m);
a monitoring and a control of the engines;
a management of the speeds of rotation or of the torques of propulsive members with control laws adapted to prevent the occurrence of unbalanced thrusts; and
a transmission of data via a network of enhanced reliability and efficiency.

Hereinafter in the description, N is a strictly positive integer which corresponds to the number of engines on each side of a plane of symmetry of an aircraft with distributed propulsion, i and j are integers lying between 1 and 2N inclusive which represent the numbers of the engines in the distributed propulsion system.

Figure 1:
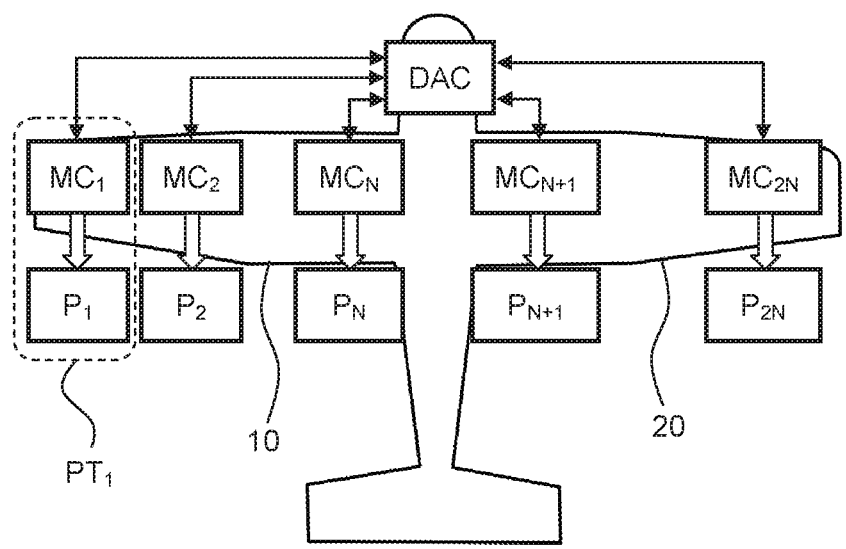
FIG. 1, a diagram of a distributed propulsion system in which powertrains are connected to a data analysis and processing component.

FIG. 1 represents, according to an embodiment, a diagram of a distributed electrical propulsion system in an electrical airplane, the distributed propulsion system comprising 2N powertrains PTi distributed uniformly between the left wing 10 and the right wing 20 of the airplane. Each powertrain PTi comprises or is composed of an engine-controller assembly MCi and of a propulsive member Pi coupled to the engine-controller assembly.

Each powertrain is connected through its engine-controller assembly to a data analysis and processing component DAC which allows the supervision of all of the engine data.

According to the embodiment illustrated and in which the propulsion is exclusively electrical, each engine-controller assembly comprises or is composed of an electric motor and its controller, the controller mainly comprising a microcontroller in which are mainly implemented regulation loops and control laws.

According to the method of the disclosure herein, each controller communicates with all the other controllers, directly or via external components, so as to determine the regulation laws to be applied to each engine in order to limit the creation of an unbalanced thrust in case of engine failure in the distributed propulsion system leading to yaw and/or roll torques greater than thresholds established by the regulations.

In the exemplary embodiment illustrated, the distributed propulsion system comprises or is composed of 2N powertrains, N on each wing, mounted in parallel. When a powertrain fails, each of the controllers of the other operational powertrains adapts its regulation control in order to maintain the controllability of the airplane while limiting the impact of the failure on the performance levels of the airplane.

According to the method, to forestall a persistent thrust imbalance in case of engine failure, two distinct ways are implemented.

First Way: by Shutting off at Least One Engine

The first way includes shutting off, at least in terms of thrust delivered, the engine(s) complementing the failing engine(s).

This method makes it possible to counter the loss of thrust induced on a wing by a failure of an engine of the distributed propulsion system by a shutting-off of the complementary engine on the opposite wing so as to maintain overall thrusts, on each wing, that are symmetrical.

The complementary engine of a given engine is the engine which is symmetrical to it in relation to a plane of symmetry of the airplane, provided that the two engines are equivalent at least from the thrust delivered point of view.

One necessary condition for the feasibility of the solution, both according to the first way and according to the second way described later, is therefore to have a symmetrical arrangement of the powertrains in relation to a plane of symmetry of the airplane and for each pair of symmetrical engines to be formed by engines of the same thrust, in which case the engine torque is the to be symmetrical.

Preferably, a symmetrical pair of engines contains strictly identical engines.

In the embodiment illustrated, the distributed propulsion system comprises or is composed of 2N powertrains numbered 1 to 2N, the left wing comprising the groups 1 to N and the right wing comprising the groups N+1 to 2N.

The natural integer N is greater than or equal to 1, preferably greater than or equal to 2.

Generically, the index j of a powertrain complementing a powertrain of index i is given by the bijective formula:

$j=2N-i+1$

Figure 2:
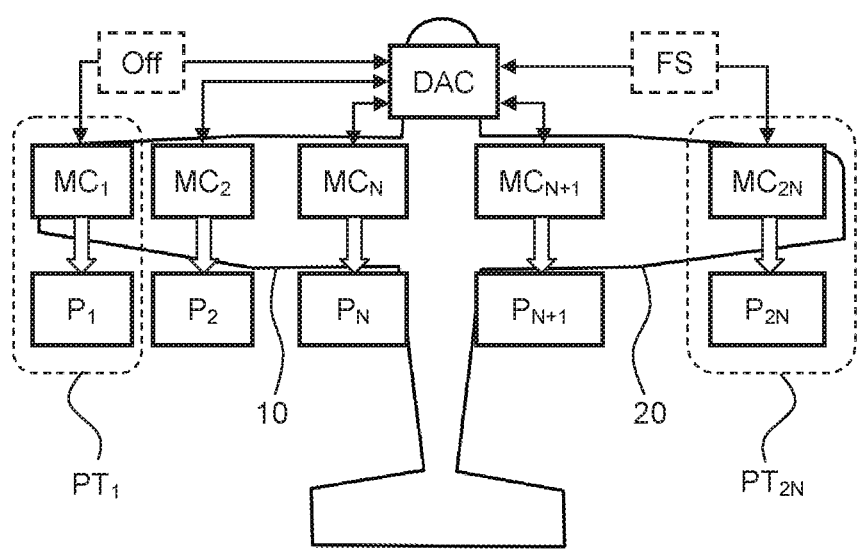
FIG. 2, the diagram of FIG. 1 in which a shut-off instruction is send to a powertrain complementing a failing train.

In FIG. 2 for example, the powertrain PT1 is the one complementing the powertrain PT2N.

A description of the method that is a subject of the disclosure herein is provided below according to the first way implemented through an example of engine failure.

A failure affects the powertrain PTi which no longer delivers speed, and therefore thrust, the controller of its engine-controller assembly MCi sends a failure signal FS to the data analysis and processing component DAC, the data analysis and processing component then orders the shutting off of the powertrain PT2N−i+1, complementing the failing train, by sending it a shut-off signal "Off".

In a mode of implementation corresponding for the case of an engine failure which would not lead to a total shut-off of the engine concerned, the shutting-off of the engine is forced upon the execution of the command to shutoff the complementary engine so as to obtain nil speed and thrust for each of the two complementary engines.

In another mode of implementation corresponding to the case of an engine failure leading to a lowering of speed to a stabilized speed, the complementary engine is sent an instruction to establish a speed similar to that of the failing engine so as to keep the thrusts balanced on the engines concerned.

FIG. 2 illustrates the case where a failure occurring on the powertrain PT2N leads to a shut-off of the powertrain PT1 which is its complement, according to the first way of implementation of the disclosure herein.

The distributed propulsion system therefore continues to deliver an equal thrust on each wing, thus avoiding the appearance of an imbalance which could lead to a loss of control of the airplane by a pilot untrained in multi-engine management.

A variant embodiment for implementing the method according to the first way includes connecting, directly without involving the data analysis and processing component, each powertrain to its complement such that a failure occurring in one necessarily leads to the shutting-off of the other, each engine forming a kind of circuit breaker for its complement.

The latter architecture is more robust and allows a redundancy in the control of shutting-off of the engines in case of failure, via the inter-engine connections and shut-off on pilot command.

Second Way: by Power Regulation in at Least One Engine

The second way includes adjusting the overall thrust on the wing opposite the wing comprising the failing engine so as to cancel the yaw and roll moments induced by the imbalance. The modification in effect makes it possible to have overall thrusts per wing whose moments in relation to the center of gravity of the airplane are opposite, and is obtained by an adjustment of the power of all of the engines of the unaffected wing.

Figure 3:
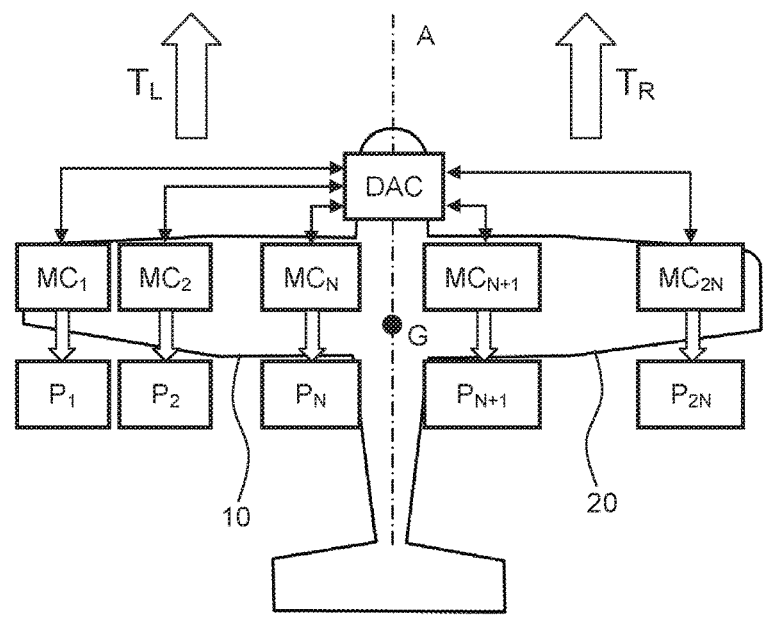
FIG. 3, a diagram of a distributed propulsion system producing symmetrical overall thrusts on the wings.

FIG. 3 schematically represents the entire distributed propulsion assembly in a nominal mode of operation, the powertrains of the left wing 10 generating an overall thrust TL equal to an overall thrust TR generated by the powertrains of the right wing 20. The symmetry of the distributed propulsion assembly in relation to a plane of symmetry A of the airplane passing through the center of gravity of the airplane G induces a symmetry of the two thrusts in relation to this plane of symmetry such that the yaw moment of the airplane is nil, to within regulatory tolerances.

Figure 4:
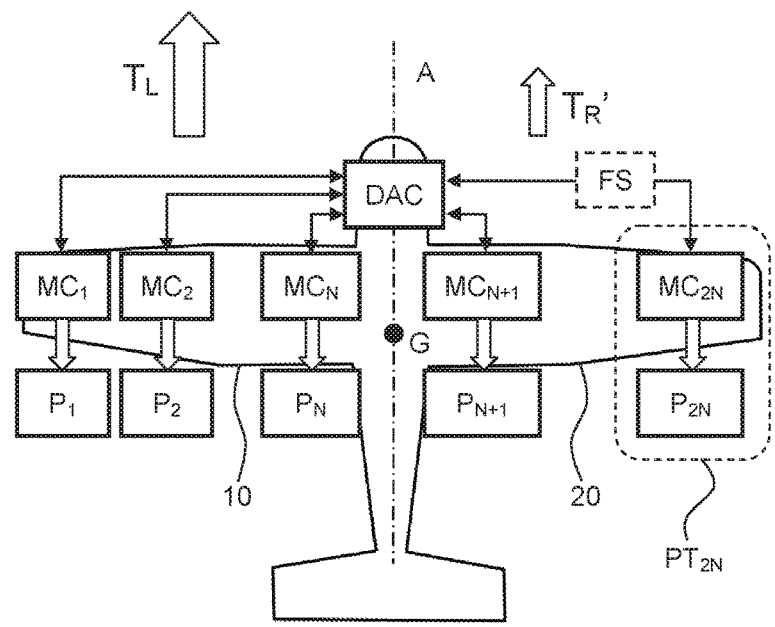
FIG. 4, the diagram of FIG. 3 in which the overall thrust on the right wing is reduced because of an engine failure.

FIG. 4 illustrates the state of the thrusts after the failure has occurred in the powertrain PT2N for example, the resulting new thrust TR' on the right wing 20 is lower in intensity and is exerted at a shorter distance from the plane of symmetry A from the thrust TR delivered by the powertrains of the wing concerned before the failure.

This rupture of symmetry between the overall left and right thrusts of the airplane means a non-nil yaw moment.

In order to manage this imbalance, the failing powertrain informs the data analysis and processing component DAC of the occurrence of the failure by sending of the failure signal FS, the data analysis and processing component then sends to each powertrain of the wing opposite that of the failing train a specific instruction Si to adjust the engine speed and torque in order to adjust the overall thrust on the wing concerned to the thrust on the wing comprising the failing powertrain.

Figure 5:
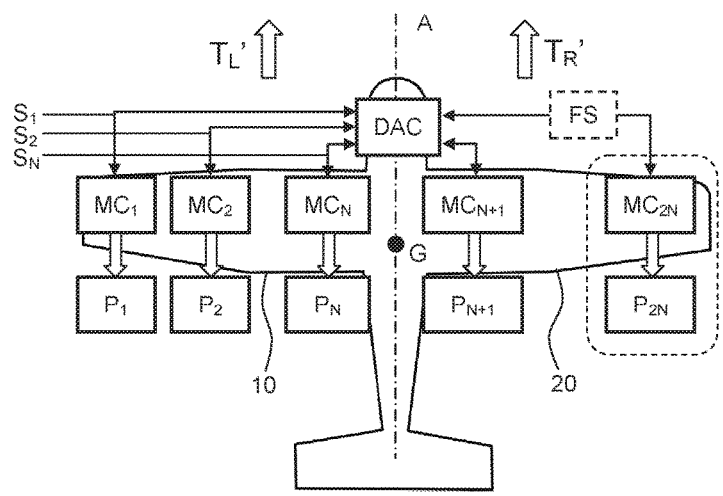
FIG. 5, the diagram of FIG. 4 in which the overall thrust on the left wing is adjusted to manage the imbalance.

The specific instructions Si to adjust engine speed and torque are sent to the controllers of the engine-controller assemblies MCi as illustrated in FIG. 5.

In the example illustrated in FIGS. 3, 4 and 5, the method applied according to the second way then allows the powertrains of the left wing 10 to compensate the reduced overall thrust TR' of the right wing 20 by a new overall thrust TL' which is identical to it. The two thrusts are symmetrical in relation to the plane of symmetry A of the airplane, thus preventing the occurrence of a thrust imbalance and, thereby, of any yaw moment which would result therefrom.

By virtue of a very limited response time, the regulatory permanent speed is rapidly reached without the slightest loss of control by the pilot.

An imbalance can also be caused by an uncontrolled increase in the thrust delivered by a given engine, and which cannot be compensated by an alignment of the speed of the symmetrical engine because of the exceeded operating limits. In this case, the failing engine originating the increased thrust is shut-off, and the method according to the disclosure herein is implemented according to one of the two ways.

The computation of the specific engine adjustments instructions can be done with adaptive control algorithms or iterative algorithms for example, the computation of the speeds and of the torques of the different engines must be optimized with constraints such as, for example, having close engine speeds by limiting the difference between the engine speeds, the most stable configuration, or the solution which consumes the least energy.

The method therefore relies on the computation algorithms implemented in the data analysis and processing component DAC and/or in the controllers of the engines. The chosen solution includes implementing $2(N+1)$ transfer matrices in each controller, each transfer matrix allows the computation of the engine speed and torque necessary to an engine for the regulation of the thrust as a function of the state of the engine which is linked to it by the transfer matrix. In effect, each controller must be linked to all the controllers of the opposite wing and to the data analysis and processing component by two matrices each, a transfer matrix and its inverse.

Given that there are N controllers per wing and 1 data analysis and processing component, that makes $2(N+1)$ transfer matrices per controller.

It is necessary to note that the two transfer matrices implemented in a controller i and which correspond to its relationship with a controller j are the same as those implemented in the controller j and which correspond to its relationship with the controller i. This redundancy is very useful because it allows each controller running to have all the matrices it needs despite total failures in the other controllers to which it is linked.

Figure 6:
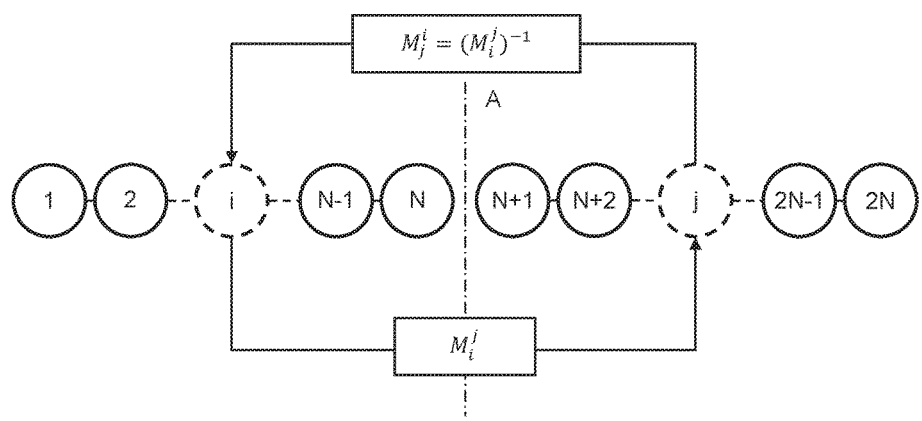
FIG. 6, generic diagram of the transfer matrices implemented in two powertrains i and j.

As an example, FIG. 6 illustrates the two transfer matrices between a controller i and a controller j implemented in each of the controllers. The matrix, allowing the computation of the instruction of the controller i as a function of the state of the controller j, is denoted $M_j^i$ and is equal to the inverse of the matrix allowing a computation in the reverse direction, that is to say from the controller i to the controller j:

$$M_j^i = (M_i^j)^{-1}$$

The disclosure herein as described is primarily intended for electrical aviation and allows a notable improvement in the safety and the performance levels of the electric airplanes intended for novice or inexperienced pilots.

The disclosure herein can also be applied to any other aircraft with distributed propulsion and incorporating an automated control of its engines.

While at least one exemplary embodiment of the invention herein(s) is disclosed herein, it should be understood that modifications, substitutions and alternatives may be apparent to one of ordinary skill in the art and can be made without departing from the scope of this disclosure. This disclosure is intended to cover any adaptations or variations of the exemplary embodiment(s). In addition, in this disclosure, the terms "comprise" or "comprising" do not exclude other elements or steps, the terms "a", "an" or "one" do not exclude a plural number, and the term "or" means either or both. Furthermore, characteristics or steps which have been described may also be used in combination with other characteristics or steps and in any order unless the disclosure or context suggests otherwise. This disclosure hereby incorporates by reference the complete disclosure of any patent or application from which it claims benefit or priority.

The invention claimed is:

1. A method for managing unbalanced thrusts caused by engine failures in an aircraft comprising a distributed propulsion system, the distributed propulsion system comprising 2N powertrains, where N is a strictly positive integer representing a number of engines on each side of a plane of symmetry of the aircraft, distributed symmetrically in relation to the plane of symmetry of the aircraft, wherein each powertrain comprises an engine-controller assembly, comprising an engine and a controller of the engine, coupled to a propulsive member and wherein each controller of a first side is assigned numerically to all the controllers of the opposite side by two transfer matrices each, the method comprising:
    transmitting a failure signal from a corresponding controller of a failed engine to a data analysis and processing component of the aircraft; and
    reducing a power of at least one powertrain belonging to a first side of the plane of symmetry when a failure signal is received by a powertrain belonging to an opposite side, such that a sum of moments of thrusts generated by the powertrains in relation to a center of gravity of the aircraft is approximately zero.

2. The method according to claim 1, wherein when a failure affects a powertrain of a first side and cancels thrust delivered by the powertrain, the powertrain of a symmetrical opposite side of the powertrain that is failing is shut off.

3. The method according to claim 2, further comprising transmitting, from the data analysis and processing component, a shut-off signal to the controller of the powertrain that is a symmetrical counterpart of the failing powertrain.

4. The method according to claim 1, wherein when a failure affects a powertrain of a first side and reduces overall thrust on the first side, the powers of the powertrains of the opposite side are adjusted so as to have an overall thrust on the opposite side of a moment in relation to the center of gravity of the aircraft equal to and opposite the moment of the overall thrust on the first side in relation to the center of gravity of the aircraft.

5. The method according to claim 4, further comprising transmitting, from the data analysis and processing component to the controller of each powertrain of the opposite side, a signal comprising specific instructions to adjust the engine speed and/or torque.

6. The method according to claim 5, wherein, each controller is assigned numerically to the one or more processors by two matrices equally.

7. The method according to claim 1, wherein in each of the 2N controllers 2(N+1) transfer matrices are implemented which allow computation of the speed and torque necessary to each powertrain to adjust overall thrust on a first side including the powertrain as a function of speeds and torques of the powertrains belonging to the opposite side.

8. An aircraft comprising a data analysis and processing component, comprising one or more processors, and a distributed propulsion system, the aircraft being configured to implement a method for managing unbalanced thrusts caused by engine failures in an aircraft provided with a distributed propulsion system, the distributed propulsion system comprising 2N powertrains, where N is a strictly positive integer representing a number of engines on each side of a plane of symmetry of the aircraft, distributed symmetrically in relation to the plane of symmetry of the aircraft;
    wherein each powertrain comprises an engine-controller assembly, comprising an engine and a controller of the engine, coupled to a propulsive member, and wherein each controller of a first side is assigned numerically to all the controllers of the opposite side by two transfer matrices each;
    wherein, upon engine failure, each controller is configured to transmit a failure signal to the data analysis and processing component of the aircraft; and
    wherein the aircraft is configured to reduce a power of at least one powertrain belonging to a first side of the plane of symmetry when a failure signal is received from a powertrain belonging to an opposite side, such that a sum of moments of thrusts generated by the powertrains in relation to a center of gravity of the aircraft is approximately zero.

9. The aircraft according to claim 8, in which the distributed propulsion is electrical.

10. The aircraft according to claim 8, in which the distributed propulsion is hybrid.

* * * * *